Dec. 6, 1955     E. W. YUNGMAN     2,725,639

JIG FIXTURE

Filed June 5, 1953

INVENTOR.

ELROY W. YUNGMAN

BY

*Gunter A. Wolff*

ATT

United States Patent Office 2,725,639
Patented Dec. 6, 1955

2,725,639

JIG FIXTURE

Elroy W. Yungman, Cleveland, Ohio, assignor to West Coast Aero Tool Company, Los Angeles, Calif., a corporation of California Application June 5, 1953, Serial No. 359,790

3 Claims. (Cl. 33—191)

This invention relates in general to jig fixtures and, more particularly, to locating jig fixtures such as used to locate on drill jigs the position of lock screws for fixed and slip-renewable bushings.

The general object of this invention is the provision of a compact lock screw locating jig fixture constructed to readily permit in restricted areas of drill proper location of the position of lock screws for fixed and slip-renewable bushings.

This general object of the invention is attained by a lock screw locating jig fixture embodying an axially elongated punch and an axially perforated body through which the punch is axially shiftably extended, the body member being shaped to include a cylindrical lower portion having substantially the dimensions of the shoulder portion of the standard lock screw to be used for the particular fixed or slip-renewable drill bushing, and a second cylindrical portion larger in diameter than said first portion and adapted to contact with the end wall of the milled recess in the head of the respective fixed or slip-renewable drill bushing when the jig fixture is placed on the drill jig adjacent to the drill bushing for locating the position of its lock screw.

A further object of the invention therefore is the provision of a lock screw locating jig fixture embodying an elongated punch and an axially perforated body member shiftably supporting the punch in its axial bore and shaped to include a cylindrical base portion having substantially the dimensions of the shoulder portion of the standard lock screw to be used for holding the respective drill bushing and a cylindrical top portion larger in diameter than said base portion adapted to contact with the end wall of the locking recess in the head of the said respective drill bushing for locating the position of its lock screw when the jig fixture is placed on a drill jig adjacent to a drill bushing to contact with its cylindrical top portion the end wall of the recess in the head of the drill bushing.

Still another object of the invention is the provision of a lock screw locating jig fixture of the type described above which, in addition to said two cylindrical portions, includes two additional cylindrical portions, a larger one arranged directly above the top cylindrical portion adapted to contact in inverted position of the body with the end wall of the recess in the head portion of a drill fixture and a smaller one at the upper end of the jig fixture adapted to rest and support the drill fixture on a drill in such inverted position of the body of the fixture.

Additional objects and other novel features of construction and relations of parts by which the objects in view have been attained will appear and are set forth in detail in the course of the following specification.

The drawing accompanying and forming part of the specification illustrates a certain practical embodiment of the invention, but it will be apparent as the specification proceeds that the structure may be modified and changed in various ways without departure from the true spirit and scope of the invention.

Figure 1:
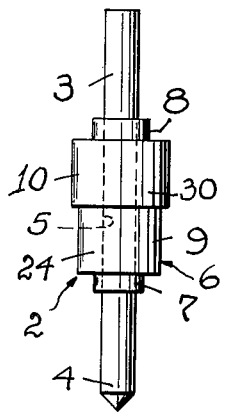
Fig. 1 is a side view of a lock screw locating jig fixture constructed in accordance with the invention.
Figure 2:
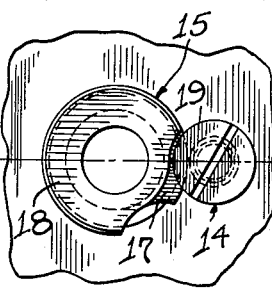
Fig. 2 is a fragmentary plan-view of a drill jig showing a slip-renewable bushing held in place by a lock screw.
Figure 3:
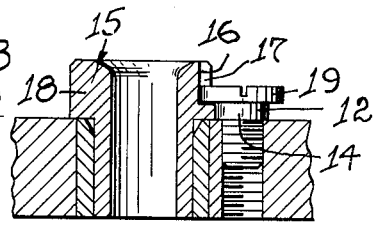
Fig. 3 is a sectional view on line 3—3 of Fig. 2.

Referring now in detail to the exemplified form of the invention shown in the drawing, the lock screw locating jig fixture 2 shown therein embodies an axially elongated punch 3 which is pointed at its lower end 4. Punch 3 is axially shiftably supported in the axial bore 5 of a supporting and guiding body 6 which includes at its lower and upper ends differently dimensioned, relatively small cylindrical portions 7 and 8 and between such portions two other differently dimensioned cylindrical portions 9 and 10 which are substantially larger in diameter and height than portions 7 and 8.

Cylindrical portions 7 and 8 serve to support the drill fixture on a drill jig and are dimensioned in accordance with the height of neck portions 12 of the lock screws 14 used to hold standardized fixed and slip-renewable bushings 15 in their drill jigs and cylindrical portions 9 and 10 serve to laterally space the jig fixture from the drill bushings by contact with the end walls 16 of the milled recesses 17 in heads 18 of the bushings and are dimensioned to properly space the heads 19 of the lock screws from such end walls of unimpeded rotation of the lock screws. The four cylindrical portions 7, 8, 9 and 10 adapt the jig fixture for locating lock screw positions for all standardized fixed and slip-renewable bushings, as cylindrical portions 7 and 9 correspond to the two differently sized neck portions of lock screws used for holding such drill bushings and as cylindrical portions 8 and 10 correspond to the two differently sized heads 19 of lock screws for such bushings.

Figure 4:
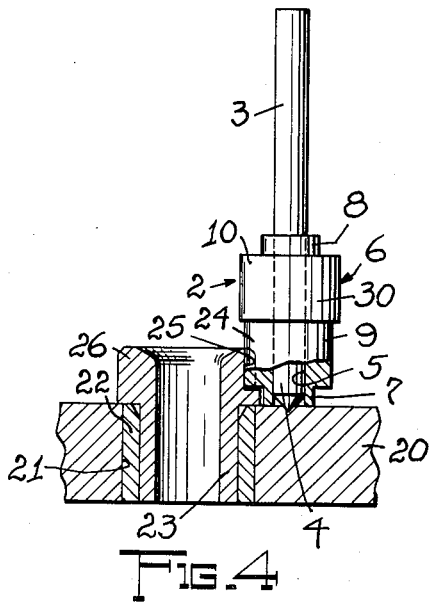
Fig. 4 is a fragmentary vertical sectional view through a drill jig showing the lock screw locating jig fixture adjacent to a slip-renewable bushing in a lock screw locating position with respect to the bushing.
Figure 5:
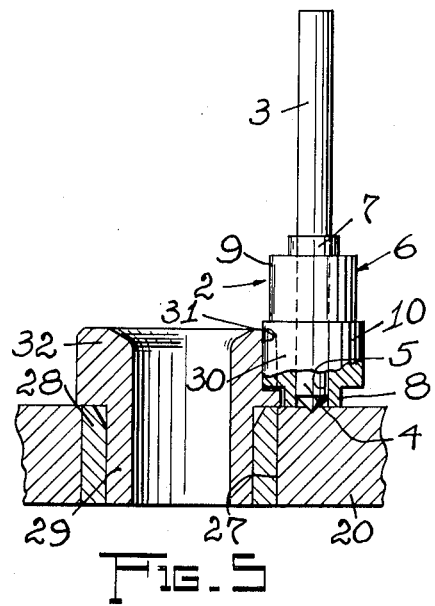
Fig. 5 is another fragmentary vertical sectional view through a drill jig showing the lock screw locating fixture in lock screw locating position for a slip-renewable bushing of larger size than the drill bushing shown in Fig. 4, the body of the jig fixture being inverted to adapt the fixture for the larger type of drill bushing.

In lock screw locating operations the thus proportioned cylindrical portions 7, 8, 9 and 10 of body 6 pairwise cooperate with punch 3 to properly locate and mark the position of a lock screw, that is, cylindrical portions 7 and 9 cooperate with punch 3 for locating the lock screws for smaller type of bushings and lock screws and cylindrical portions 8 and 10 cooperate with punch 3 for locating the lock screws for the larger type of bushings, all as shown in Figs. 4 and 5. Thus, in Fig. 4 the jig plate 20 seats in a bore 21, lined by a headless steel liner 22, a small drill bushing 23 and furthermore seats the jig fixture which rests with the end face of its cylindrical portion 7 on the jig plate. The jig fixture contacts with peripheral wall 24 of cylindrical portion 9 end wall 25 of the recess in head 26 of the bushing, locates the position of the lock screw and permits marking of this position by actuation of punch 3. In Fig. 5 jig plate 20 seats in a bore 27, lined by a headless steel liner 28, a large drill bushing 29 and seats the jig fixture, with its body 6 in inverted position, so that the end face of cylindrical portion 8 rests on the jig plate. The peripheral wall 30 of cylindrical portion 10 of the jig fixture contacts the end wall 31 of the recess in head 32 of the bushing and thus permits proper location and marking of the position of the lock screw.

Having thus described my invention:

What I claim is:

1. The combination of a drill jig including a plate, fixed and slip-renewable headed bushings seated in bores of said plate and provided with milled recesses of predetermined depths in their peripheral head walls, and headed lock screws for clamping said bushings to said plate, with a jig fixture adapted to locate the lock screws for properly clamping the bushings to the plate, said jig fixture including an elongated punch, a base member with an axial bore having said punch axially shiftably extended therethrough, and two differently sized, coaxial cylindrical portions axially aligned with said bore, the smaller one of said cylindrical portions located at one end of the base member having a diameter substantialy equal to the neck of the headed lock screw to be located, and the larger one of said portions located adjacent to said smaller one having a diameter dimensioned to effect contact of the peripheral wall of the larger cylindrical portion with the inner wall of the milled recess in the head of a bushing when the smaller cylindrical portion contacts its peripheral wall with the peripheral wall of the head of such bushing.

2. The combination as described in claim 1, wherein the radius of the larger one of the cylindrical portions of the base member of the jig fixture is slightly larger than the combined length of the radius of the neck of the headed lock screw to be located and the depth of the milled recess in the head of the bushing to permit free rotation of the headed lock screw.

3. The combination of a drill jig including a plate, fixed and slip-renewable headed bushings seated in bores of said plate and provided with milled recesses of predetermined depths in their peripheral head walls, and headed lock screws for clamping said bushings to said plate, with a jig fixture adapted to locate the lock screws to properly clamp the bushings to the plate, said jig fixture including an elongated punch, a base member with an axial bore having said punch axially shiftably extended therethrough, and two sets of differently sized, coaxial cylindrical portions axially aligned with said bore, the smaller one of each set of said cylindrical portions being located at an end of the base member and having a diameter substantially equal to the neck of the headed lock screw to be located, and the larger one of each set of said cylindrical portions being located adjacent to the respective smaller one of said cylindrical portions and having a diameter dimensioned to effect contact of the peripheral wall of the respective cylindrical portion with the inner wall of the milled recess in the head of a bushing when the respective smaller cylindrical portion contacts its peripheral wall with the peripheral wall of the head of such bushing.

References Cited in the file of this patent

UNITED STATES PATENTS 1,233,458    Fisk _____ July 17, 1917